No. 607,876. Patented July 26, 1898.
E. PHIPPS.
BICYCLE HANDLE BAR.
(Application filed July 19, 1897.)
(No Model.)
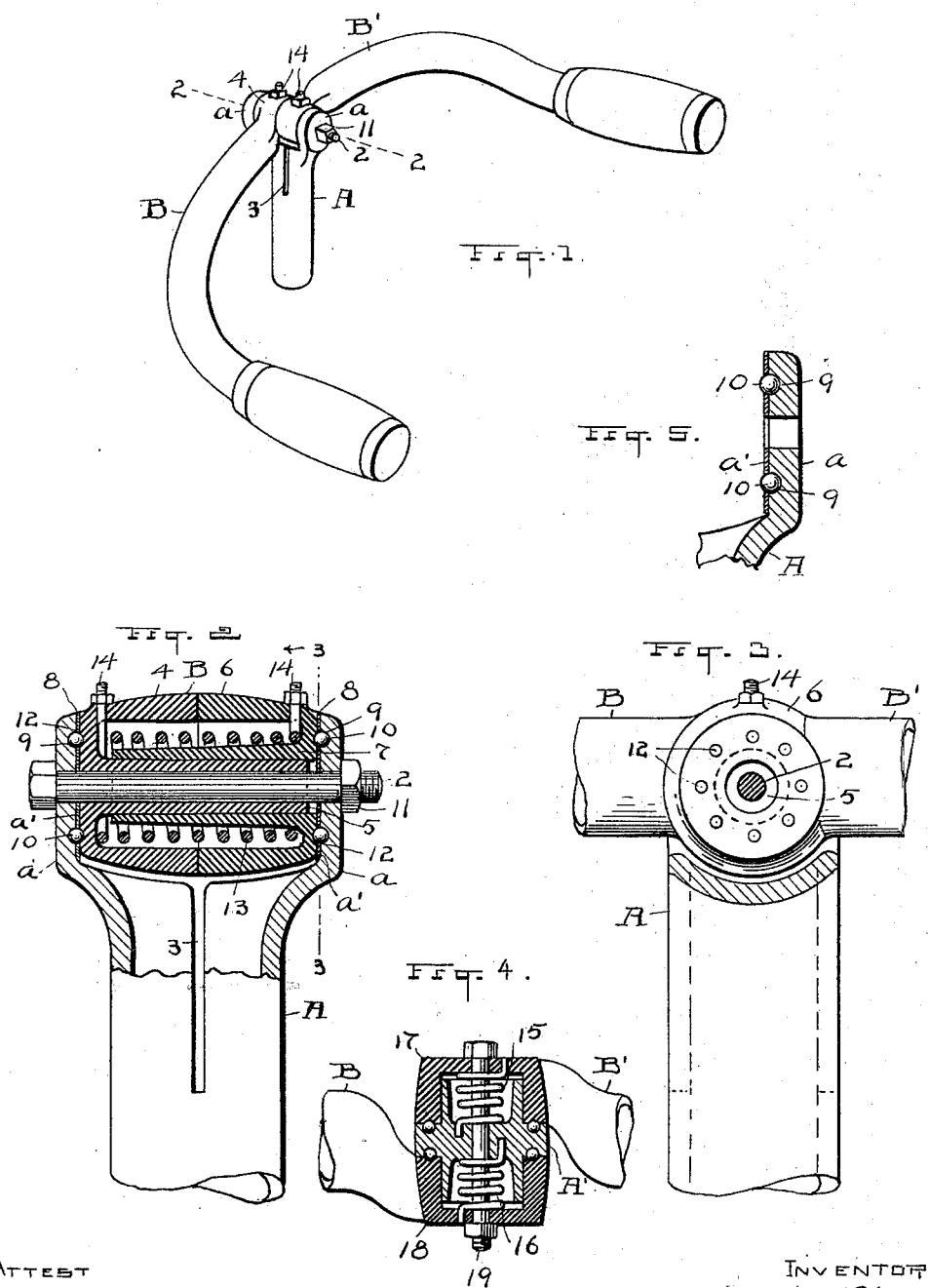

UNITED STATES PATENT OFFICE.

EDWARD PHIPPS, OF GLENVILLE, OHIO.

BICYCLE HANDLE-BAR.

SPECIFICATION forming part of Letters Patent No. 607,876, dated July 26, 1898.

Application filed July 19, 1897. Serial No. 645,046. (No model.)

*To all whom it may concern:*

Be it known that I, EDWARD PHIPPS, a citizen of the United States, residing at Glenville, in the county of Cuyahoga and State of Ohio, have invented certain new and useful Improvements in Adjustable Handle-Bars for Bicycles; and I do declare that the following is a full, clear, and exact description of the invention, which will enable others skilled in the art to which it appertains to make and use the same.

My invention relates to adjustable handle-bars for bicycles; and the improvement consists in means for adjusting the handle-bars and also for facilitating the operation of adjusting the same, substantially as shown and described, and more particularly pointed out in the claims.

Figure 1 is a perspective view of my improved handle-bar. Fig. 2 is an enlarged sectional view on line 2 2, Fig. 1, of the head-post and the inner ends of the handle-bars. Fig. 3 is a sectional view on line 3 3, Fig. 2. Fig. 4 is a plan sectional view of a modification, and Fig. 5 is a detail of the ball-retaining plate and ear.

In the accompanying drawings, A represents the head-post of a bicycle, and B B' the two handle-bars supported thereon. The top of the post is split at 3, and lugs or ears $a$ extend upward at each side, between which the inner ends of the handle-bars are supported and clamped therein by the bolt 2. The inner end of each handle-bar is cup-shaped, and one of these cups, 4, has a long boss 5, through which the bolt 2 passes, and the other cup, 6, has a similar boss 7, but constructed to sleeve over the boss 5. The bolt 2 passes through the ears $a$ and boss 5, and a nut 11 on the end of the bolt clamps the whole together; but to effect a better clamping of the faces 8 of the cups and to prevent slipping after the handles are adjusted a series of depressions 9 are made in the inside face of each ear $a$ and balls 10 are laid therein, which partly extend beyond the face and into corresponding depressions 12 in the face of the cups 4 and 6. The depressions in the ears $a$ are slightly deeper than those in the cups. When the whole is clamped together, the balls 10 rest in their respective depressions, and the handle-bars are unable to slip from the position as set.

A coiled spring 13 is used to prevent the handle-bars from dropping by their own weight when the bolt and nut are unloosened to make an adjustment, and this spring is coiled around boss 7 and held within the cups 4 and 6. The ends of the spring are fastened at 14 to the cups 4 and 6, respectively, and the torsional force of the spring holds up the handle-bars when the bolt and nut are unloosened to make an adjustment, and the end compression of the spring will always keep the faces 8 of the ears and cups together and keep the balls in place.

When an adjustment is made by raising or lowering the handle, the balls will remain in the deeper depressions in the ears $a$, and the face 8 of the cups 4 and 6 will ride over the balls against the compression of the spring 13.

The torsional force of the spring serves to hold the handle-bars up when the bolt is considerably loosened, and the end compression serves to keep the balls in place and the handles set at any angle until the operator raises or lowers the bars to make an adjustment.

A modification is shown in Fig. 4, in which two springs 15 and 16 are used to accomplish the same result, the balls and head being placed between the cups 17 and 18 and the bolt 19 clamping the whole together, as in the other form.

In Fig. 5 a thin plate $a'$ is shown, which has holes for the balls of less diameter than the same, the plate being fastened or soldered to the ears $a$ to keep the balls in the depressions 9 when the handle-bars are entirely removed for cleaning or the like.

What I claim is—

1. In a bicycle, a head-post, handle-bars comprised of two parts pivoted by a bolt to said post, the ends of said handle-bars being cup-shaped and depressions in their faces corresponding to depressions in the face of the head-post, balls for said depressions, a coiled spring to keep the ends of said handle-bars in locking relation to said head-post by means of said balls, and said spring having enough torsional force to hold said handle-bars in raised position while making an adjustment, substantially as described.

2. In a bicycle, a head-post, handle-bars B, B' supported on said post by a bolt, said handle-bars having their supporting ends cup-shaped, a coiled spring having its ends fastened to said cups to hold the handle-bars in raised position while an adjustment is about to be made, depressions in the face of the cups and the post, balls in said depressions to lock said post and handle-bars together when clamped by said bolt, and said spring being arranged to keep said parts in locking relation while an adjustment is being made, substantially as described.

Witness my hand to the foregoing specification this 10th day of July, 1897.

EDWARD PHIPPS.

Witnesses:
H. T. FISHER,
R. B. MOSER.